UNITED STATES PATENT OFFICE.

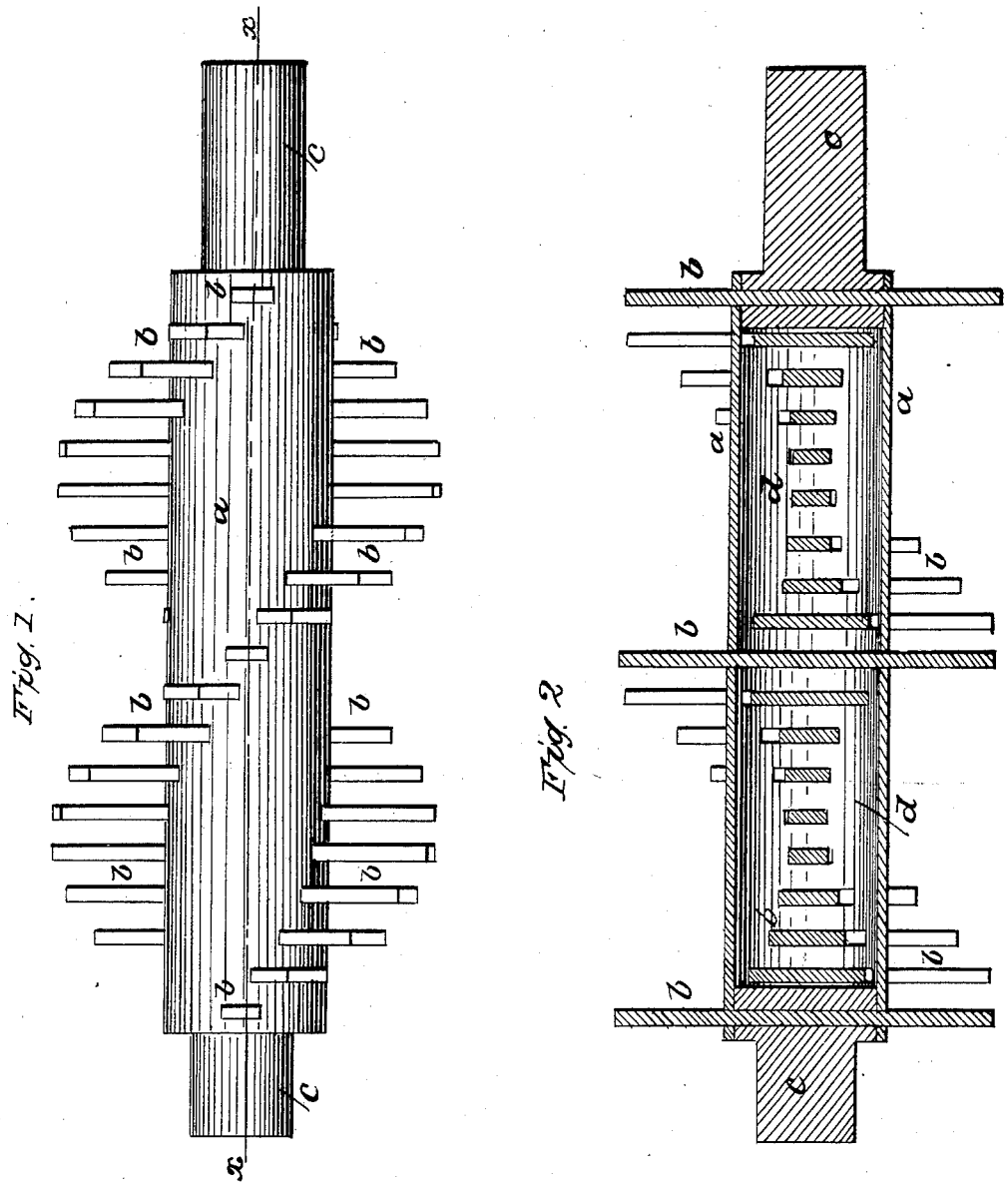

B. MACKERLEY, OF NEW PETERSBURG, OHIO.

TOOTHED CYLINDER FOR GRINDING.

Specification of Letters Patent No. 20,282, dated May 18, 1858.

*To all whom it may concern:*

Be it known that I, BENJAMIN MACKERLEY, of New Petersburg, in the county of Highland and State of Ohio, have invented an Improved Toothed Cylinder for Grinding and other Purposes; and I do hereby declare that the following is a full and exact description thereof, reference being had to the accompanying drawings, making a part of this specification, Figure 1, being a side view of said cylinder and Fig. 2 a section in the line $x$ $x$ of Fig. 1.

I take a section of lap-welded boiler tube, or any other suitable hollow metallic cylinder, ($a$,) and perforate the same with a double series of diametrically opposite apertures of the proper shape and size to receive the series of teeth $b$, $b$; which teeth, in connection with the journal-pieces $c$, $c$, when properly combined with said tube, form my improved toothed-cylinder. The journal-pieces $c$, $c$, should be of such a size that their inner ends will, when in a cold state, closely fit within the ends of the tube $a$, after it has been expanded by the action of heat.

Each journal-piece $c$, must be perforated near its inner end with a diametrical aperture whose cross-section corresponds in size and shape with that of the apertures in the tube $o$. The journal-pieces $c$, $c$, must be placed in such positions within the tube $a$, that the teeth $b$, $b$, which pass through the apertures nearest to the ends of said tube, will also pass through the apertures in said journal-pieces. After fitting one of the journal-pieces within one end of the tube $a$, in the manner herein before indicated, both the tube and the journal-pieces should be expanded by heat and then while in that state, the entire series of teeth $b$, $b$, must be driven into all the apertures in said tube, with the exception of the two apertures nearest to the opposite end of the same; then the said tube, when thus prepared, must be placed in a vertical position, with its open mouth uppermost, and a cement $d$, composed of brick dust and melted rosin, or any other suitable materials, must be poured into the tube until only space enough is left at the upper end of the tube to receive the remaining journal-piece which is then to be fitted into its proper place while the tube is in a highly heated state, and then the last tooth, in a cold state, must be driven into its proper place within the end of the tube and within the last mentioned journal-piece, which completes my said invention.

A toothed-cylinder thus constructed of wrought metal and cement, can be afforded at a very low price and is greatly superior to anything of a similar shape constructed in any other manner of either cast or wrought iron.

What I claim as my invention and desire to secure by Letters Patent, is—

Producing a new manufacture, in the shape of an improved toothed cylinder, by combining a properly perforated tube $a$, with a series of teeth $b$, $b$, and the journal-pieces $c$, $c$, in substantially the manner herein set forth.

The above specification of my improved toothed cylinder for grinding purposes, signed and witnessed this 27th day of February 1858.

BENJAMIN MACKERLEY.

Witnesses:
   HENRY HIATT,
   JAMES E. MACKERLEY.